United States Patent [19]
Wagner et al.

[11] 3,894,600
[45] July 15, 1975

[54] CRAWLER TRACTOR FINAL DRIVE HOUSING STRUCTURE AND MOUNTING THEREFOR

[75] Inventors: Joseph F. Wagner; William Benjamin Knight; Dan James Mihal, all of Dubuque, Iowa

[73] Assignee: Deere & Company, Moline, Ill.

[22] Filed: May 2, 1974

[21] Appl. No.: 466,122

[52] U.S. Cl. ............................. 180/9.2 R; 305/10
[51] Int. Cl.² ............................................ B62D 55/12
[58] Field of Search ............ 180/9, 9.2 R, 71, 73 D; 305/10, 56

[56] References Cited
UNITED STATES PATENTS

| | | |
|---|---|---|
| 2,452,671 | 11/1948 | Merrill .................................. 305/10 |
| 3,332,725 | 7/1967 | Reinsma ............................... 305/10 |
| 3,477,766 | 11/1969 | Linsay .................................. 305/10 |
| 3,765,730 | 10/1973 | Ishida ................................... 305/10 |
| 3,787,097 | 1/1974 | Orr ....................................... 305/10 |

*Primary Examiner*—Philip Goodman
*Assistant Examiner*—John A. Carroll

[57] ABSTRACT

Final drive housings are mounted on the opposite sides of the main transmission housing of a crawler tractor and the final drives located within the housings are arranged and the housings are constructed and mounted such that the housings may be optionally secured in first and second positions for respectively disposing final drive output shafts thereof in rearward and forward positions to drive similarly disposed track structures such that the tractor is supported advantageously for dozer and loader work.

4 Claims, 4 Drawing Figures

CRAWLER TRACTOR FINAL DRIVE HOUSING STRUCTURE AND MOUNTING THEREFOR

BACKGROUND OF THE INVENTION

The present invention relates to the final drive transmissions of a crawler tractor and more particularly relates to structure by which the final drive transmissions may be optionally mounted for driving the tracks of track structures located in rearward and forward positions for respectively advantageously supporting a tractor for dozer and loader work.

It is common practice for manufacturers of crawler tractors to in effect design tractors of the same size specifically for dozer work or for loader work. The main difference between these tractors is in the framework used to support the attachments respectively required for dozer and dozer work. Another difference between the tractors is that a tractor designed for loader work has its track members disposed farther rearwardly relative to the tractor chassis than is the drive tracks of a tractor designed for loader work. The drive assemblies are respectively disposed in these positions in order to give the tractor more stability. Thus with the tracks of a tractor for dozer work being located rearwardly, the tracks are advantageously disposed for balancing the forces imposed upon a dozer blade which is normally located in a low position forwardly of the tractor while the forward position of the drive track assemblies of the loader tractor bring the tracks to a position better suited for supporting a raised loader bucket of a tractor doing loader work.

Heretofore, it has been the practice to provide one final drive structure for use with a tractor designed for dozer and another final drive structure for use with a tractor designed for loader work. This practice is not satisfactory due to the expense involved in making two different final drive transmission designs for tractors of the same size.

SUMMARY OF THE INVENTION

According to the present invention, there is provided a novel final drive structure and mounting therefor.

A broad object of the invention is to provide a final drive structure and mounting therefor designed such that common final drive structures may be used in combination with tractors designed for dozer and for loader work.

A more specific object of the invention is to provide final drive transmissions in combination with a main transmission having a housing from the opposite sides of which extend shafts located on a first horizontal transverse axis and projecting into respective final drive housings, the housings being optionally mountable on the main transmission housing for movement between a first position wherein output shafts of the final drive transmissions are forwardly of a vertical transverse plane passing through the first axis and a second position wherein the final drive output shafts are located rearwardly of the plane.

Still a more specific object of the invention is to provide final drive transmissions as described in the previous paragraph which are bolted on the opposite sides of the main transmission housing and wherein the pattern of the bolts is symmetrical to the vertical plane passing through the horizontal axis containing the input shafts to the final drive transmissions whereby the final drive transmissions may be disposed in their first and second positions by selectively mounting them on different sides of the main transmission housing.

These and other objects will become apparent from a reading of the ensuing description in conjunction with the appended drawings.

DESCRIPTION OF THE PREFERRED EMBODIMENT

Figure 1:
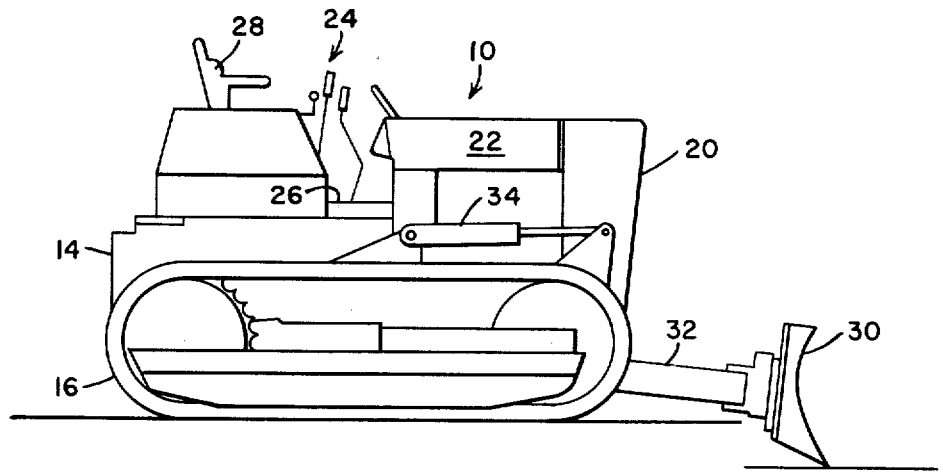
FIG. 1 is a schematic right side view of a crawler tractor having a dozer blade mounted thereon.
Figure 2:
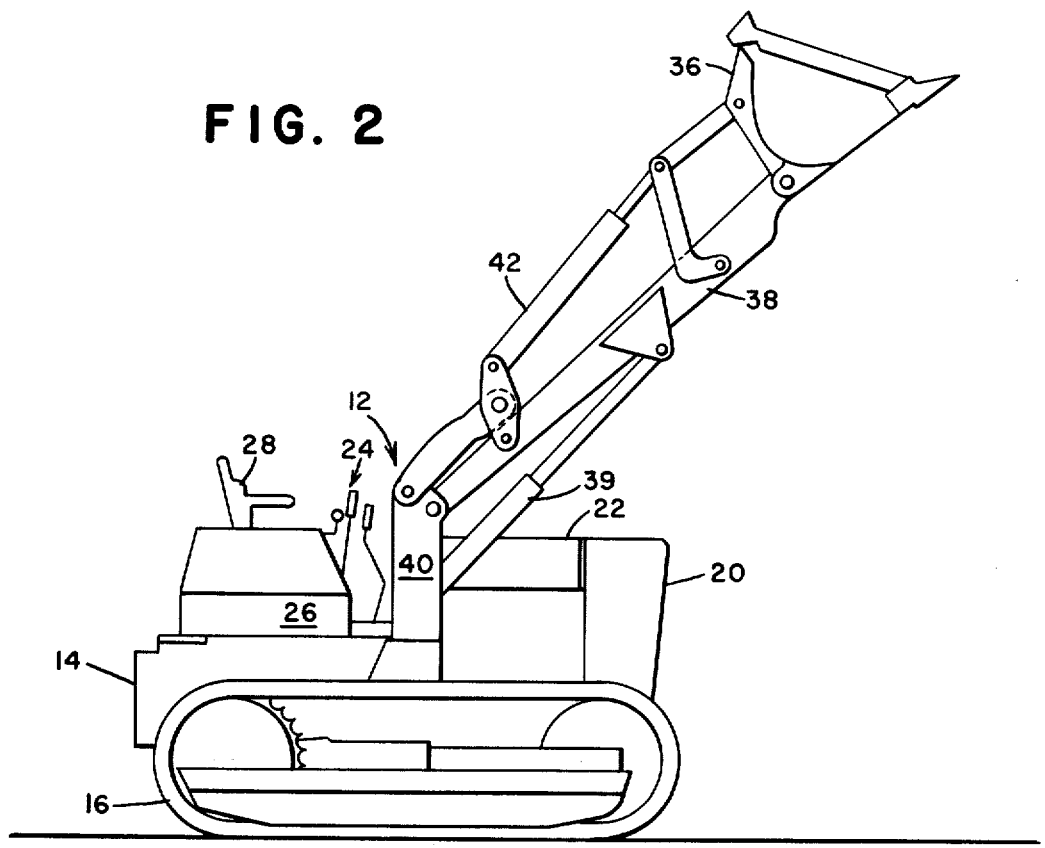
FIG. 2 is a schematic view similar to FIG. 1 but showing the crawler tractor with a loader bucket mounted thereon.

Respectively shown in FIGS. 1 and 2 are a crawler tractor 10 designed and equipped for dozer work and a crawler tractor 12 designed and equipped for loader work. While not necessary to the proper performance of the present invention, as will be evident from the discussion below, various parts of the tractors 10 and 12 are illustrated as being identical and are given identical reference numerals. Thus, the tractors 10 and 12 each include a longitudinal chassis 14 located between and supported in a conventional manner not shown, on right and left track structures or assemblies 16 and 18. Mounted on the forward end of each tractor chassis 14 is a grille housing 20 which encloses a radiator and fan assembly (not shown). Behind the grille housing 20 of each tractor is an engine compartment 22, which of course houses an engine (not shown). An operator's station 24 is located rearwardly of the engine compartment 22 of each tractor and includes a platform 26 supporting a seat 28 for supporting an operator within easy reach of various controls for the tractor and equipment mounted thereon.

Referring now to FIG. 1, a dozer blade 30 is shown fixed to the forward end of a push arm structure 32 having rear end portions (not shown) pivotally connected to the tractor 10 for vertical swinging movement. An extensible and retractable hydraulic actuator is located on each side of the tractor 10 and is mounted between a frame part thereof and the push arm structure 32, only the right actuator 34 being shown.

Referring now to FIG. 2, a loader bucket 36 is shown vertically pivotally connected to the forward ends of a pair of lift arm structures 38 disposed on opposite sides of the tractor, and having a respective pair of lift cylinders 39 connected thereto, of which only the right arm structure and cylinder are shown, and having rearward end portions vertically pivotally connected to an upright support frame structure 40 of the tractor 12. Connected between the pair of lift arm structures 38 and the bucket 36 are a pair of powered bucket tilt linkages 42, of which only the right one is shown.

Attention is brought to the fact that the right and left track structures 16 and 18 of the tractor 10 are located further rearwardly relative to the chassis 14 than the track structures 16 and 18 of the tractor 12 are relative to its chassis 14. The rearward disposition of the track assemblies of the tractor 10 is selected so as to best support and distribute the weight of the tractor 10 for resisting loads imposed on the dozer blade 30 when the tractor 10 is doing dozer work. Similarly, the forward disposition of the track assemblies of the tractor 12 is selected so as to best support and distribute the weight of the tractor 12 for supporting loads carried by the bucket 36 when the tractor 12 is doing loader work.

The present invention resides in a structure by which a common final drive structure may be employed on the tractors 10 and 12 for driving respective tracks of the track structures 16 and 18 regardless of whether they are to be disposed rearwardly relative to the chassis 14 for the dozer work or forwardly relative to the chassis 14 for loader work.

Figure 3:
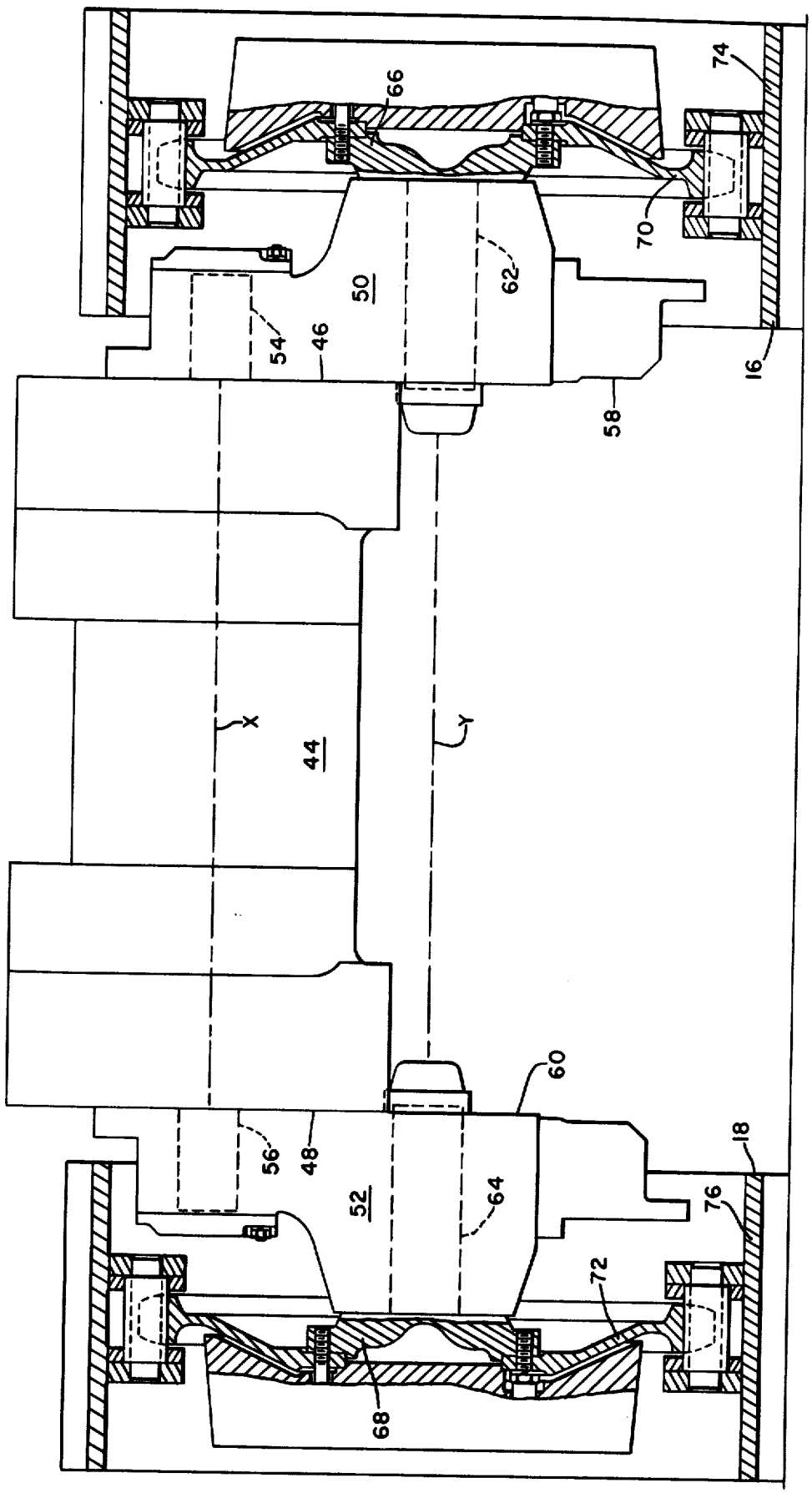
FIG. 3 is a somewhat schematic rear elevational view with parts in section showing the main and final drive transmissions of a crawler tractor.
Figure 4:
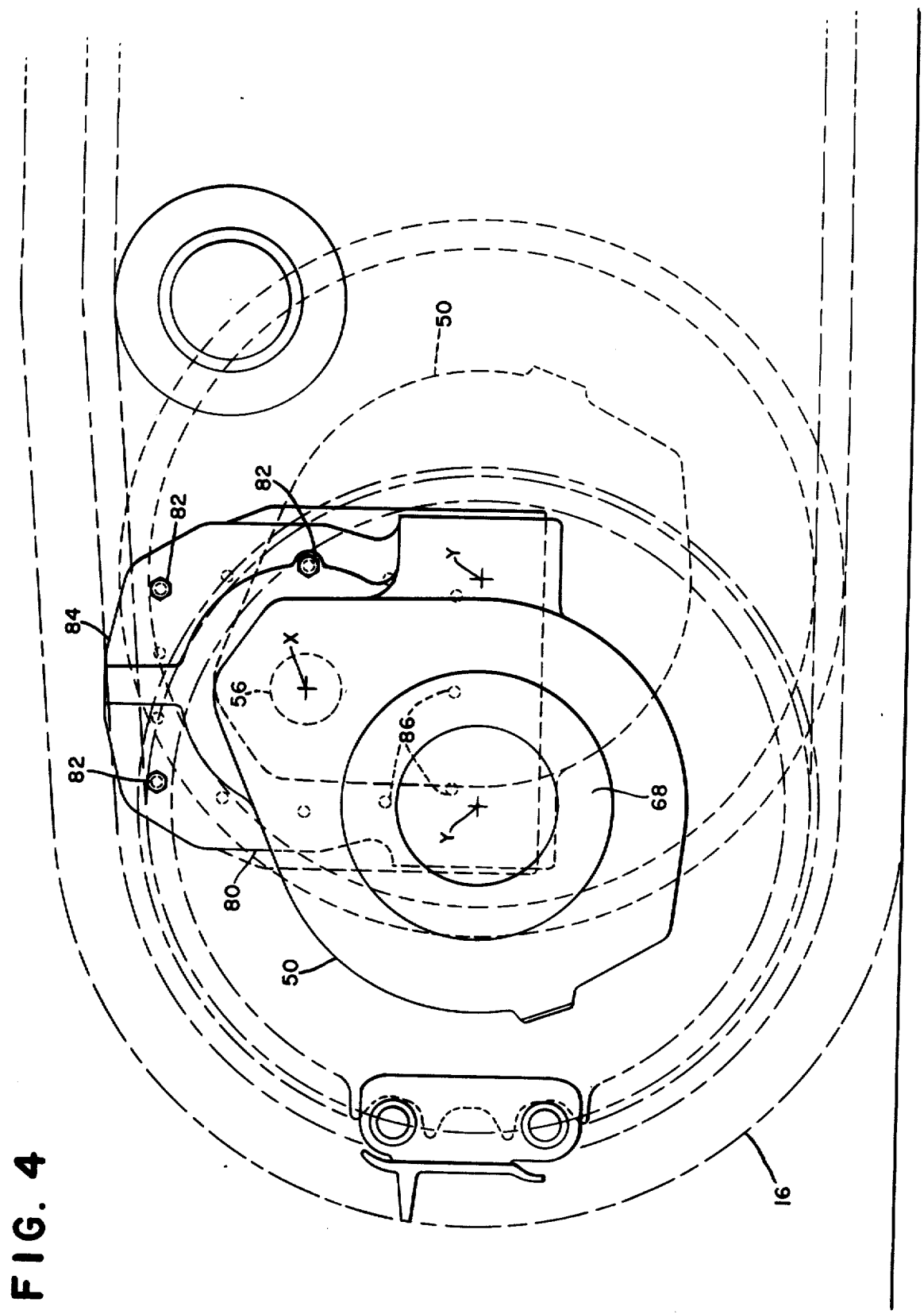
FIG. 4 is a right side elevational view of a final drive transmission shown in solid lines as it would appear when mounted for driving the tracks in a rearward disposed position for dozer work, and being shown in dotted lines in the position for driving the tracks in a forwardly disposed position for loader work.

Specifically, the chassis 14 of each tractor 10 and 12 has a rear portion (FIG. 3) defined by a transverse main transmission housing 44 having opposite right and left outwardly facing surfaces 46 and 48, respectively having right and left final drive transmissions 50 and 52 secured thereto in a manner to be described below. The main transmission housing 44 has main transmission elements located therein and including right and left final drive input shafts 54 and 56, respectively, projecting oppositely into housings 58 and 60 of the final drive transmissions 50 and 52 along a fixed horixontal transverse axis X. The final drive transmissions 50 and 52 respectively include final drive output shafts 62 and 64 mounted in respective ones of the housings 58 and 60 for rotation about a second horizontal transverse axis Y, as can best be seen in FIG. 4, which is respectively located forwardly and rearwardly of a vertical transverse plane passing through the axis X when the transmissions 50 and 52 are respectively disposed in rearward positions and forward position respectively corresponding to the solid and dotted line positions of the transmissions 50, it being noted that when the transmission 50 is in the dashed line position, it is mounted on the left surface 48 of the main transmission housing 44. The output shafts 62 and 64 respectively terminate in flanges 66 and 68 to which are fixed track drive sprockets to and 72 respectively of the right and left track structures 16 and 18. The sprockets 70 and 72 are respectively drivingly engaged with endless tracks 74 and 76.

The structure making mounting of each of the final transmissions 50 and 52 on either side of the main transmission housing 44 possible is similar, and is described with reference only to the transmissions 50. Thus, the housing 58 of the transmission 50 includes a mounting portion 80 secured to the main transmission housing 44 through means of a bolting arrangement including a plurality of bolts, three of which are shown at 82, extending through holes of a flange section 84 of the mounting portion 80 and threaded into holes provided in the transmission housing 44. The mounting portion 80 of the housing 58 also includes a plurality of threaded holes 86 in which bolts (not shown) extending through the main transmission housing 44, from the inside thereof, are received. The mounting bolts are located in a pattern which is generally rectangular and are arranged symmetrically relative to the transverse vertical plane passing through the axis X. Thus, because of the symmetry of the bolting pattern, it will be appreciated that the final drive transmission 50 may be moved from the solid line position in FIG. 4 to the dotted line position by merely mounting it on the other side of the main transmission housing 44. Of course, the position of the transmission unit 52 can be similarly switched.

Accordingly, the final drive transmission of the present invention and the mounting means therefore cooperate such that the right and left transmissions of a tractor designed for dozer work may be respectively used as the left and right transmissions of a tractor designed for loader work.

It is to be noted that the necessity for switching the right and left final drive transmission units arranged on a tractor designed for dozer work to the opposite sides of a tractor so as to be arranged for loader work could be obviated by using a circular bolting pattern.

We claim:

1. In a track-laying tractor including a chassis extending longitudinally between right and left longitudinally extending drive track assemblies, said chassis including a main transmission housing defining a rear portion thereof and containing transmission means defining right and left transverse drive shafts projecting oppositely and forming respective input drive shafts drivingly coupled to right and left final drive transmission means respectively contained in right and left final drive housings having respective mounting portions fixed to right and left surfaces of the main transmission housing, said right and left final drive transmission means respectively including right and left output drive shafts extending parallel to said input drive shafts and respectively having drive sprockets to the right and left track assemblies secured thereto, the improvement comprising: said respective mounting portions of the right and left final drive housings being secured by fastener means arranged symmetrically relative to a transverse vertical plane passing through said input drive shafts; and said right and left output drive shafts being disposed forwardly of the plane with the drive track assemblies being located in a forward position relative to the chassis when the tractor is to do loader work, whereby the right and left final drive housings may optionally be respectively mounted on the left and right sides of the main transmission housing for disposing the respective output drive shafts thereof rearwardly of said plane with the drive track assemblies being located in a rearward position relative to the chassis when the tractor is to do dozer work.

2. In a track-laying tractor including a main transmission housing located between and having opposite sides fixed to respective ones of a pair of final drive transmission housings, a pair of final drive input shafts located on a first horizontal, transverse axis and projecting oppositely from the main transmission housing means respectively said pair of final drive transmission housings; a pair of final drive output shafts rotatably fixed in and respectively projecting oppositely from the pair of final drive transmission housings and adapted for respectively having a pair of track drive sprockets fixed thereto for rotation therewith, the improvement comprising: said pair of final drive output shafts being located on a second horizontal transverse axis extending parallel to said first axis and located forwardly of a vertical plane passing through said first axis whereby the final drive output shafts are disposed for driving track assemblies located in a forward location relative to the transmission, for properly supporting the tractor when the latter is to be used for loader work; and a pair of mounting means respectively securing the pair of final drive transmission housings to the main transmission housing and being arranged relative to said first axis for optionally mounting the pair of final drive transmission housings in positions disposing said final drive output shafts along a third horizontal transverse axis extending parallel to the first and second axis and located rearwardly of the plane, whereby the final drive output shafts are disposed for driving track assemblies located in a rearward location relative to the transmission, for properly supporting the tractor when the latter is to be used for dozer work.

3. In a track-laying tractor transmission including a main transmission housing located between a pair of final drive housings and containing a pair of final drive input shafts extending into the final drive housings along a first axis; a pair of releasable fastener means respectively securing said pair of final drive housings to the main transmission housing and the pair of final drive housings respectively containing a pair of outwardly projecting final drive output shafts displaced from the first axis and adapted for having a pair of track drive sprockets fixed thereto for rotation therewith, the improvement comprising: said fastener means being so located relative to said first axis that said final drive housings may be mounted at optional positions for disposing the final drive output shafts at selected fore-and-aft positions relative to a vertical transverse plane passing through said first axis, whereby track assemblies of the tractor may be advantageously located relative to the transmission for properly supporting the tractor when it is optionally equipped for performing different functions such as loading and dozing.

4. The transmission defined in claim 3 wherein said pair of releasable fastening means each include a generally rectangular arrangement of bolts disposed symmetrically relative to said plane; said pair of final drive output shafts being displaced forwardly and rearwardly of the plane when in respective first and second positions for driving track assemblies disposed for advantageously supporting a tractor for loader and dozer work and said final drive housings being movable between their first and second positions by mounting them on opposite sides of the main transmission housing.

* * * * *